United States Patent
Gledich et al.

(10) Patent No.: US 10,623,122 B2
(45) Date of Patent: Apr. 14, 2020

(54) SYSTEMS AND METHODS FOR PAIRING A PLURALITY OF WIRELESS INTERFACES IN A VEHICLE

(71) Applicant: Systems and Software Enterprises, LLC, Brea, CA (US)

(72) Inventors: Matthew Gledich, Mission Viejo, CA (US); Romain Lecomte, Tustin, CA (US); Samuel A. Carswell, Yorba Linda, CA (US); Brian Andrew Simone, Huntington Beach, CA (US)

(73) Assignee: Systems and Software Enterprises, LLC, Brea, CA (US)

( * ) Notice: Subject to any disclaimer, the term of this patent is extended or adjusted under 35 U.S.C. 154(b) by 0 days.

(21) Appl. No.: 16/226,161

(22) Filed: Dec. 19, 2018

(65) Prior Publication Data

US 2019/0190631 A1 Jun. 20, 2019

Related U.S. Application Data

(60) Provisional application No. 62/607,443, filed on Dec. 19, 2017.

(51) Int. Cl.
*H04H 20/62* (2008.01)
*H04W 4/80* (2018.01)
(Continued)

(52) U.S. Cl.
CPC ........ *H04H 20/62* (2013.01); *H04N 21/2146* (2013.01); *H04W 4/42* (2018.02); *H04W 4/48* (2018.02); *H04W 4/80* (2018.02)

(58) Field of Classification Search
CPC .......... H04H 20/62; H04W 4/42; H04W 4/48; H04W 4/80; H04N 21/2146;
(Continued)

(56) References Cited

U.S. PATENT DOCUMENTS 9,326,308 B2 * 4/2016 Okamoto .............. H04W 12/06
9,694,725 B2 * 7/2017 Watson ................. H04L 67/125
(Continued)

FOREIGN PATENT DOCUMENTS

EP 3086301 A1 10/2016
WO 2010064235 A1 6/2010

OTHER PUBLICATIONS

European Patent Office, Written Opinion of the International Searching Authority, dated Mar. 26, 2019.

*Primary Examiner* — Alexander Gee
(74) *Attorney, Agent, or Firm* — Ryan Dean; Umberg Zipser LLP

(57) ABSTRACT

System and methods are described for automatic pairing a plurality of devices within a vehicle. Based on a seat mapping stored within a server, a seat display unit and its allocated peripherals can be paired in sequence, one-by-one. Thus, a first seat display unit and its allocated peripherals can be powered on. Then, the peripherals can be paired with the first seat display unit, and the first seat display unit and the allocated peripherals can be powered down. Once this is complete, the next seat display unit and its allocated peripherals can be powered on, paired, and then powered down before continuing in sequence until all peripherals are paired with their allocated seat display units.

10 Claims, 2 Drawing Sheets

(51) Int. Cl.
*H04W 4/42* (2018.01)
*H04W 4/48* (2018.01)
*H04N 21/214* (2011.01)

(58) Field of Classification Search
CPC ............. H04N 21/214; H04N 21/2665; H04N 21/414; H04N 21/41407; H04N 21/41422
See application file for complete search history.

(56) References Cited

U.S. PATENT DOCUMENTS

| | | |
|---|---|---|
| 2004/0077308 A1 | 4/2004 | Sanford et al. |
| 2006/0246892 A1* | 11/2006 | vonDoenhoff ........ H04W 28/16 455/427 |
| 2016/0057790 A1* | 2/2016 | Sim ...................... H04W 76/14 455/41.1 |
| 2016/0119914 A1* | 4/2016 | Oizumi ................ H04W 16/14 370/329 |
| 2016/0162015 A1* | 6/2016 | Moon ................... G06F 1/3287 713/310 |
| 2016/0318625 A1 | 11/2016 | Troy et al. |

* cited by examiner

SYSTEMS AND METHODS FOR PAIRING A PLURALITY OF WIRELESS INTERFACES IN A VEHICLE

This application claims priority to U.S. provisional patent application having Ser. No. 62/607,443 filed on Dec. 19, 2017. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is wireless interfaces pairing for aircraft and other vehicles.

BACKGROUND

The background description includes information that may be useful in understanding the present invention. It is not an admission that any of the information provided herein is prior art or relevant to the presently claimed invention, or that any publication specifically or implicitly referenced is prior art.

Although aircraft and other vehicles used to utilize wired connections for in-flight entertainment and other services, it is preferred that new installations utilize wireless connections that allow existing wires to be removed where applicable. This saves time during installation for new hardware, and reduces the weight of the aircraft thereby make the aircraft more fuel efficient. In addition, the lack of hardwired connections enables the vehicle's seating arrangement to be modified more easily without requiring a rewire of the cabin or interior of the vehicle for example.

Although systems for pairing a single device are known, such as that described in U.S. Pat. No. 9,694,725 to Watson, et al., pairing of many devices currently requires manual pairing of the devices one at a time. The increased use of wireless interfaces increases the number of devices that must be paired in order for the system to work properly. Typically, maintenance or other crew members manually paired the various devices, requiring a substantial amount of time, especially as the number of devices increases.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Over time, physical wires for wired connections of in-flight entertainment (IFE) devices and services are being replaced with wireless connections (e.g., BLUETOOTH protocol, 802.11, 802.15.4, etc.). Unlike their wired counterparts, wireless devices can advantageously be added to the in-flight entertainment or other system with significantly less installation work required around each seat. It is contemplated that only power will be necessary for these devices. This will in turn make available additional locations around the seat as no wired connection would be required to provide a connection (other than power).

During installation or reconfiguration of the IFE devices, each device will need to be paired or associated with each display or a seat's IFE center. This could be seat-specific, seat row-specific, or region-specific within the vehicle. For example, peripherals such as audio jacks, PCUs, near-field communication units (NFCs), etc. will need to be paired with the embedded RDU/DDS so they will function for that seat/customer. With the larger number of wireless devices that will be installed in the vehicle, there exists a need for automatic set up/pairing of each seat's wireless devices to reduce installation and set up time.

Thus, there is still a need for systems and methods for automatic set up/pairing of the wireless devices/interfaces in the vehicle.

SUMMARY OF THE INVENTION

The inventive subject matter describes systems and methods for automatic pairing of wireless devices in an aircraft or other vehicle. Although the below discussion focuses on an aircraft, it is contemplated that the systems and methods discussed herein could likewise be used on ships, trains, busses, and other vehicles.

Contemplated systems and methods for automatic pairing of devices within a vehicle include providing a seat map of the vehicle, which could be stored in the memory of the server which also has a processor. The seat map can include a location of each of the seats within the vehicle, and more specifically, an electronic mapping of the location of each of the seat display units as well as each peripheral for use with one of the seat display units. In some contemplated embodiments, the electronic mapping can include which of the plurality of devices (e.g., peripherals and seat display units) are located on which ports communicatively coupled with the server.

It is further contemplated that the vehicle will have a set of seat display units, where each of the seat display units is typically associated with a specific seat of an aircraft. Many, if not all of the seat display units will be disposed within a seat, such as the neighboring seat in front. However, some of the seat display units could be disposed in a bulkhead or divider, or other location within the vehicle.

Contemplated systems and methods include sending a first signal to a first display unit of the vehicle to thereby cause the wireless radio of the first display unit to power on for pairing peripherals with the first display unit.

A second signal can be sent to each of the peripherals to be paired with the first display unit, to thereby power on each of those peripherals. Once powered on, the system automatically begins the pairing process such that each of those peripherals is paired with the first display unit. Once paired, the peripherals and first display unit are instructed via a third signal to power down.

The pairing of peripherals with seat display units continues by powering on a second seat display unit and the peripherals to be paired with the second display unit, by sending a signal to each of them. Once powered on, the system can configure the peripherals to begin pairing with the second seat display unit. Once paired, the peripherals and second display unit are instructed via a signal to power down.

This process can continue to power on and off each of the remaining radio associated with each of the remaining seat display units in sequence based on the stored seat map and the peripherals to be associated with each radio, one by one, until each peripheral associated with each seat is paired with its respective display unit of that seat.

Various objects, features, aspects and advantages of the inventive subject matter will become more apparent from the following detailed description of preferred embodiments, along with the accompanying drawing figures in which like numerals represent like components.

DETAILED DESCRIPTION

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. One should appreciate that the systems and methods described herein eliminate the need for manual pairing of each peripheral with an associated seat display unit. As the number of peripherals per display unit continues to increase, the amount of time and money required to complete this pairing manually also increases. Via the concepts described herein, a crew member can start a pairing process that will then automatically pair each of the peripherals with their associated seat display units.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figures 1A, 1B, 1C:
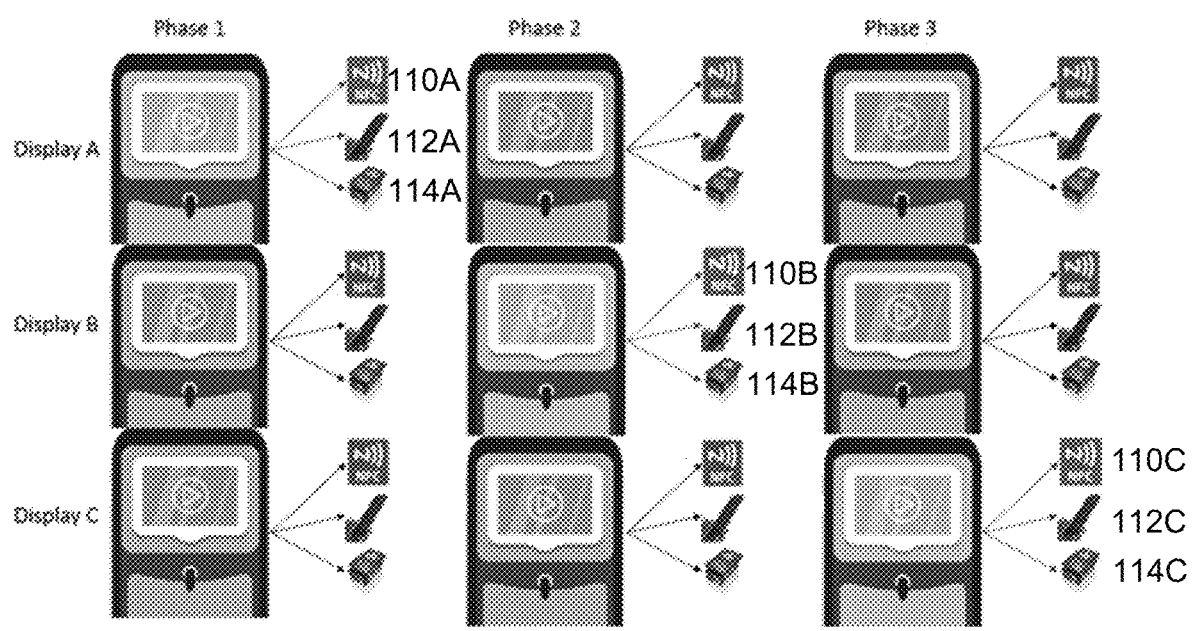
FIGS. 1A-1C illustrate a diagram of a sequential pairing of peripherals with a specific seat display unit.

FIGS. 1A-1C illustrate the sequential pairing of sets of peripherals with a specific seat display unit, each of which is disposed within a seat back of the vehicle. As shown in FIG. 1A, display unit A disposed in a first seat receives a first signal, such as from a server, that causes a first wireless radio 110A of the first display unit to power on. The set of one or more peripherals 112A, 114A to be paired with first display unit A receive a second signal such as from a server, which causes the one or more peripherals 112A, 114A to also power on. As shown in FIG. 1A, during this process, the display units B and C and their associated peripherals are powered off.

The peripherals 112A, 114A are configured to operate in a mode to pair the peripherals 112A, 114A with the first display unit A, such as by receiving a signal from a server or other device. Once the peripherals 112A, 114A are paired with the first display unit A, the server or other component is configured to send a signal to the peripherals 112A, 114A and the first radio 110A to power down.

Once the peripherals 112A, 114A and first radio 110A are powered down, the system begins the pairing process for the second display unit B, as shown in FIG. 1B. Here, the server or other component can send a fourth signal to the second display unit B disposed in a second seat based on the stored seat map of the vehicle to cause a second wireless radio 110B to power on. A fifth signal can be received by peripherals 112B, 114B associated with the second display unit B, which causes the peripherals 112B, 114B to power on. As shown in FIG. 1B, during this process, the display units A and C and their associated peripherals are powered off.

Once the peripherals 112B, 114B are powered on, the peripherals 112B, 114B are configured to operate in a mode to pair the peripherals 112B, 114B with the second display unit B, such as by receiving a signal from a server or other device. Once the peripherals 112B, 114B are paired with the second display unit B, the server or other component is configured to send a sixth signal to the peripherals 112B, 114B and the first radio 110B to power down.

Once the peripherals 112B, 114B and first radio 110B are powered down, the system begins the pairing process for the third display unit C, as shown in FIG. 1C. Here, the server or other component can send a signal to the third display unit C disposed in a third seat based on the stored seat map of the vehicle to cause a third wireless radio 110C to power on. A signal can be received by peripherals 112C, 114C associated with the third display unit C, which causes the peripherals 112C, 114C to power on. As shown in FIG. 1C, during this process, the display units A and B and their associated peripherals are powered off.

Once the peripherals 112C, 114C are powered on, the peripherals 112C, 114C are configured to operate in a mode to pair the peripherals 112C, 114C with the third display unit C, such as by receiving a signal from a server or other device. Once the peripherals 112C, 114C are paired with the third display unit C, the server or other component is configured to send a signal to the peripherals 112C, 114C and the first radio 110C to power down.

As shown in FIGS. 1A-1C, in each phase only one Display unit radio and its peripherals are turned on to allow pairing of those peripherals. A radio of each seat/display unit is then turned on and off, one by one, to pair them with their allocated wireless devices. In this manner, pairing of the peripherals or other devices is accomplished sequentially seat by seat automatically by the system without requiring manual pairing of each device, such as by a crew member. After a first seat's devices are paired, the radio is powered off for that seat unit to allow another seat unit to be paired with its respective wireless devices.

To accomplish this automatic pairing of devices, an electronic mapping of which devices are located on which ports, and which display they need to be associated with, is needed. The process for automatic pairing of the devices can be managed automatically by a server or the Seat Centric Unit (SCU) once the electronic mapping of the aircraft or other vehicle is provided. A map of the seats and their devices may be provided or generated. Using this map, the system can then run automatically on the network to perform the automatic pairing as described above.

Where the vehicle's interior is large enough to avoid interference between devices of different seats, it is contemplated that the system could pair two or more seats' devices simultaneously. Thus, for example, in an aircraft with forty rows of seats, it is contemplated that the devices of Row 1, Seat A, and the devices of Row 21, Seat A could be paired at the same time to reduce the overall time required to pair each device with each seat unit. In still further embodiments, it is contemplated that three or more seats could be paired at the same time where their distance between one another is sufficient to avoid interference.

Figure 2:
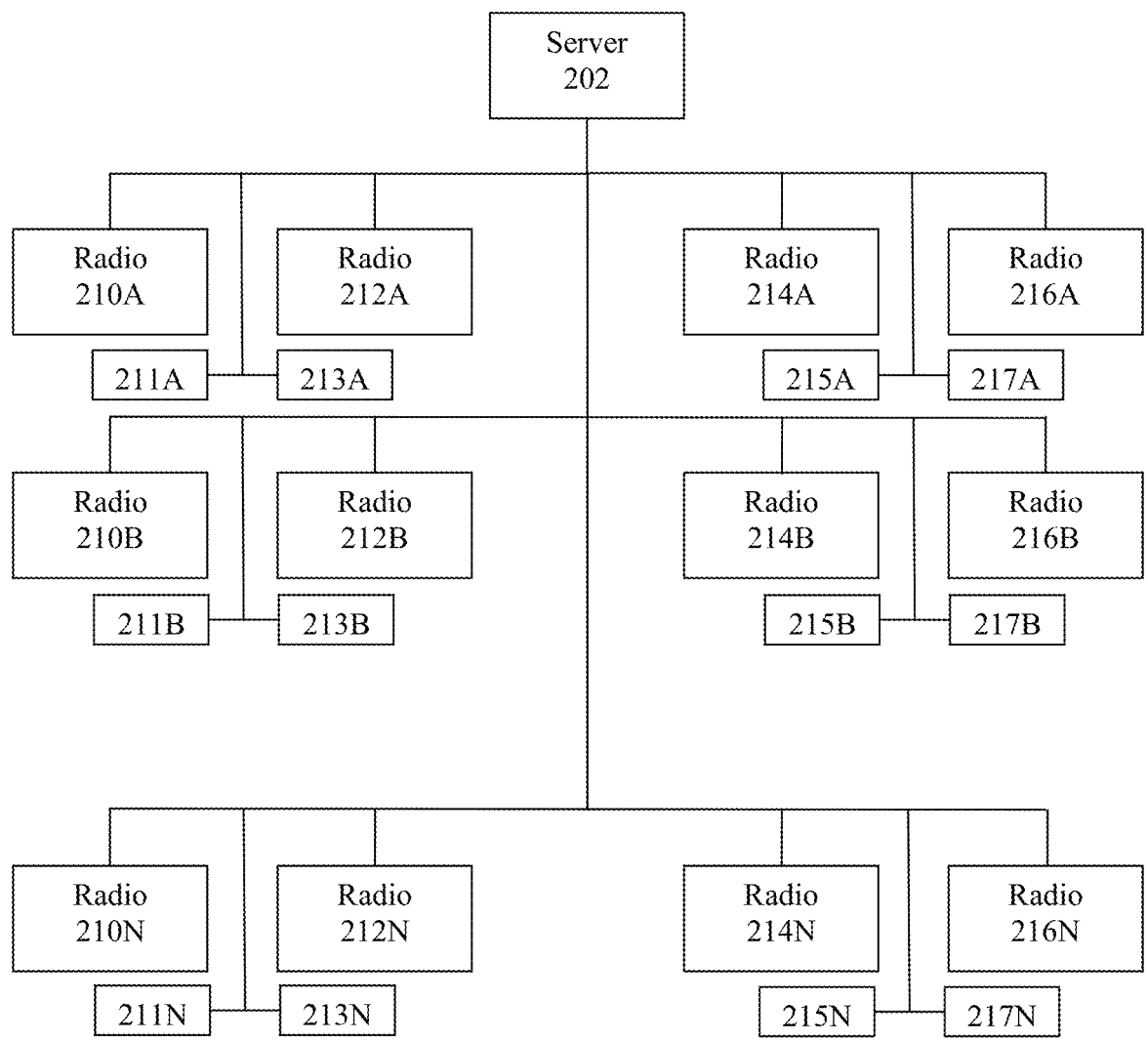
FIG. 2 illustrates an exemplary seat map that provides an electronic mapping of each of the radios of the display units and associated peripherals.

FIG. 2 illustrates an exemplary seat map that provides an electronic mapping of each of the radios (e.g., 210A, 201B, etc.) of the display units and associated peripherals (e.g., 211A, 213A, etc.). As shown, it is contemplated that the radio 210A and peripheral 211A can each be powered on, paired, and then powered on before pairing begins between radio 212A and peripheral 213A of a neighboring seat, for example. The pairing can therefore continue in sequence either across seat rows (210A-216A) or across seat columns (210A-210N), or other sequence as preferred.

As shown in FIG. 2, a server 202 can be used for generating signals to power on and off specific devices and cause certain devices to pair with another device. The server can include a processor and memory, which can store the specific program required to automatically pair the devices within the vehicle. The memory of the server also preferably stores the electronic seat mapping, which can include the ports at which each of the peripherals to be paired are connected.

Various methods for automatic pairing a plurality of devices within a vehicle are also contemplated. Such methods can include, for example, automatically powering on a first radio of a first seat's display unit based on a stored seat map of the vehicle. Next, one or more peripherals to be associated with the first seat's display unit can also be powered on, and those one or more peripherals can be paired with the first display unit. Once paired, the one or more peripherals and the first radio can be automatically powered down.

After the one or more peripherals and the first radio are powered down, a second radio of a second seat's display unit can be automatically powered on based on the stored seat map of the vehicle. One or more peripherals to be associated with the second seat's display unit can also be powered on and then paired with the second seat display unit. Once paired, the one or more peripherals and the second radio can be automatically powered down.

Continuing this sequence, each remaining radio associated with each seat can be powered on and off, one by one, until the peripherals associated with each seat are paired with their respective seat's display unit.

It is also contemplated that the system can be used to pair a new peripheral with an existing seat display unit, or pair existing peripherals with a new seat display unit such as when a seat display unit is replaced.

In some contemplated embodiments, the system can detect the presence of a new seat display unit, for example, and cause the new seat display unit and its allocated peripherals to be powered on. Once powered on, the system can cause the peripherals to pair with the new seat display unit, and then power down the peripherals and the new seat display unit.

In other contemplated embodiments, the system can periodically check whether all of the peripherals known to the system are paired with their allocated seat display unit. If any are deemed missing, either the entire routine pairing every seat display unit with peripherals one-by-one can be repeated, or the specific devices that are not paired can be signaled in sequence by the system.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for automatic pairing a plurality of devices within a vehicle, comprising:
providing access to a server having a processor and memory, and wherein a seat map of the vehicle is stored within the memory, and wherein the seat map identifies a location of each of the seats within the vehicle;
wherein the server is configured to send a first signal to a first display unit disposed in a first seat to cause a first wireless radio of the first display unit to power on;
wherein the server is further configured to send a second signal to one or more peripherals to cause the one or more peripherals to power on;
as a function of information received from the server, the one or more peripherals operating in a mode to pair each of the peripherals with the first display unit;
after the one or more peripherals are paired with the first display unit, the server is configured to send a third signal to the one or more peripherals and the first radio to power down;
wherein the server is further configured to send a fourth signal to a second display unit disposed in a second seat based on the stored seat map of the vehicle to cause a second wireless radio of the second display unit to power on;
wherein the server is further configured to send a fifth signal to one or more peripherals to cause the one or more peripherals to power on;
as a function of information received from the server, the one or more peripherals operating in a mode to pair each of the peripherals with the second display unit;
after the one or more peripherals are paired with the second display unit, the server is configured to send a sixth signal to the one or more peripherals and the second radio to power down;
wherein the server is further configured to power on and off each of the remaining radio associated with each of the remaining seat display units in sequence based on the stored seat map and the peripherals to be associated with each radio, one by one, until each peripheral associated with each seat is paired with its respective display unit of that seat.

2. The system of claim 1, wherein the seat map comprises a location of each of the plurality of devices to be paired.

3. The system of claim 2, wherein the seat map comprises an electronic mapping of which of the plurality of devices are located on which ports communicatively coupled with the server.

4. The system of claim 2, wherein the seat map comprises an electronic mapping of the first and second seat display units and the ports for each of the peripherals to be paired with the first and second seat display units.

5. The system of claim 1, wherein powering on and off of each of the plurality of devices automatically occurs as a function of signals received from the server.

6. A method for automatic pairing a plurality of devices within a vehicle, comprising:
based on a stored seat map of the vehicle, automatically powering on a first radio of a first seat's display unit;
powering on one or more peripherals to be associated with the first seat's display unit;
pairing the one or more peripherals with the first seat display unit;
once paired, automatically powering down the one or more peripherals and the first radio; and
based on the stored seat map of the vehicle, automatically powering on a second radio of a second seat's display unit;
powering on one or more peripherals to be associated with the second seat's display unit;
pairing the one or more peripherals with the second seat display unit;
once paired, automatically powering down the one or more peripherals and the second radio; and
continuing powering on and off each radio associated with each seat, one by one, until the peripherals associated with each seat are paired with their respective seat's display unit.

7. The method of claim 6, wherein the seat map comprises a location of each of the plurality of devices to be paired.

8. The system of claim 7, wherein the seat map comprises an electronic mapping of which of the plurality of devices are located on which ports communicatively coupled with the server.

9. The system of claim 7, wherein the seat map comprises an electronic mapping of the first and second seat display units and the ports for each of the peripherals to be paired with the first and second seat display units.

10. The system of claim 6, wherein powering on and off of each of the plurality of devices automatically occurs as a function of signals received from the server.

* * * * *